(12) United States Patent
Sakuragi et al.

(10) Patent No.: US 12,079,523 B2
(45) Date of Patent: Sep. 3, 2024

(54) PRINTING APPARATUS CONFIGURED TO STORE PRINT JOBS, DISPLAYS A LIST OF DOCUMENTS RELATED TO LOGGED-IN USER AND CAUSES DISPLAY UNIT TO DISPLAY SELECTABLE ITEMS FOR PRINT JOBS ACCUMULATED IN PRINTER'S MEMORY

(71) Applicant: BROTHER KOGYO KABUSHIKI KAISHA, Nagoya (JP)

(72) Inventors: Yuichiro Sakuragi, Ichinomiya (JP); Kazuki Ichikawa, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/189,292

(22) Filed: Mar. 24, 2023

(65) Prior Publication Data
US 2023/0315351 A1 Oct. 5, 2023

(30) Foreign Application Priority Data
Apr. 4, 2022 (JP) .................. 2022-062438

(51) Int. Cl.
*G06F 3/12* (2006.01)
(52) U.S. Cl.
CPC .......... *G06F 3/1205* (2013.01); *G06F 3/1238* (2013.01); *G06F 3/1253* (2013.01); *G06F 3/1255* (2013.01)
(58) Field of Classification Search
None
See application file for complete search history.

(56) References Cited

U.S. PATENT DOCUMENTS

| | | | | |
|---|---|---|---|---|
| 9,229,663 B2 * | 1/2016 | Yoshida | ................ | G06F 3/1238 |
| 2015/0062612 A1 * | 3/2015 | Nishii | ................. | H04N 1/4433 358/1.14 |
| 2016/0021262 A1 * | 1/2016 | Adachi | ............. | H04N 1/00204 358/1.15 |
| 2016/0105588 A1 * | 4/2016 | Kakutani | .......... | G06K 15/4095 358/1.14 |
| 2016/0154615 A1 * | 6/2016 | Yamamoto | ........... | G06F 3/1222 358/1.14 |
| 2022/0078301 A1 * | 3/2022 | Nakajima | ......... | H04N 1/00204 |

FOREIGN PATENT DOCUMENTS

JP 2007320166 A 12/2007

* cited by examiner

*Primary Examiner* — Haris Sabah
(74) *Attorney, Agent, or Firm* — Scully, Scott, Murphy & Presser, P.C.

(57) ABSTRACT

A printing apparatus having a print engine, a network interface, a memory, a user interface and a controller. The controller is configured to perform accumulation printing in which the controller receive selection of print data accumulated in the memory through the user interface. The controller is configured such that, for print data to which user identification information of a first user and authentication information is set, the controller causes the user interface to display selection items for such print data, while, for print data to which the user identification information for the first user is not set, the controller causes the user interface not to display the selection items for such print data. The controller is further configured to control the print engine to print the print data as selected through the user interface.

11 Claims, 9 Drawing Sheets

PRINT JOB

```
@PJL SET JOB_NAME="JOB1"
@PJL SET PRINT_USER="inoue"
@PJL SET JOB_PASSWORD="aaaa"
@PJL SET JOB_TIME="20180105162021"
@PJL ENTER LANGUAGE=PCLXL
    .
    .
    .
```

FIG. 2

AUTHENTICATION DATABASE

| Username | Login Password | Print | Scan | Copy |
|---|---|---|---|---|
| PUBLIC | | OK | OK | NG |
| inoue | 1111 | OK | OK | NG |
| kato | 2222 | NG | OK | OK |
| hayashi | 3333 | OK | NG | NG |
| minami | 4444 | NG | NG | OK |
| 51 | 52 | 53 | 54 | 55 |

FIG. 3

PRINTING APPARATUS CONFIGURED TO STORE PRINT JOBS, DISPLAYS A LIST OF DOCUMENTS RELATED TO LOGGED-IN USER AND CAUSES DISPLAY UNIT TO DISPLAY SELECTABLE ITEMS FOR PRINT JOBS ACCUMULATED IN PRINTER'S MEMORY

REFERENCE TO RELATED APPLICATIONS

This application claims priority from Japanese Patent Application No. 2022-062438 filed on Apr. 4, 2022. The entire content of the priority application is incorporated herein by reference.

BACKGROUND ART

The present disclosures relate to a printing apparatus configured to store a print job in a memory and start printing in response to receipt of a print instruction.

There has been known a printing apparatus configured such that a user (i.e., a person who intends to perform printing) can operate the printing apparatus to perform printing after he/she has logged in to the printing apparatus.

DESCRIPTION

The printing apparatus as mentioned above is typically configured to display a list of documents corresponding to the logged-in user (i.e., a user who has logged in). On the other hand, there is a case where the printing apparatus has multiple functions including functions of accumulating print jobs and, functions related to security. Therefore, when displaying information related to the accumulated print jobs in accordance with a logged-in state of a user, it becomes necessary to display the information according to the functions implemented to the printing apparatus.

According to aspects of the present disclosures, there is provided a printing apparatus having a print engine, a network interface, a memory, a user interface, and a controller. When multiple pieces of print data are accumulated in the memory, the controller is configured to perform accumulation printing. the print data based on the print job identifying a user being configured to be set with user identification information indicating the user identified in the print job, the print data based on the print job that identifies authentication information being configured to be set with the user identification information corresponding to the authentication information identified in the print job. the controller is configured to cause, in the accumulation printing, the user interface to display selectable items for the print data, among the print data accumulated in the memory, to which first user identification information.

FIG. 2 shows an example of a print job described in PJL.

FIG. 3 shows a configuration of data stored in an authentication DB.

Hereinafter, referring to FIGS. 1-9, an MFP 10 according to an embodiment will be described. The MFP 10 is an example of a printing apparatus according to aspects of the present disclosures.

Figure 1:
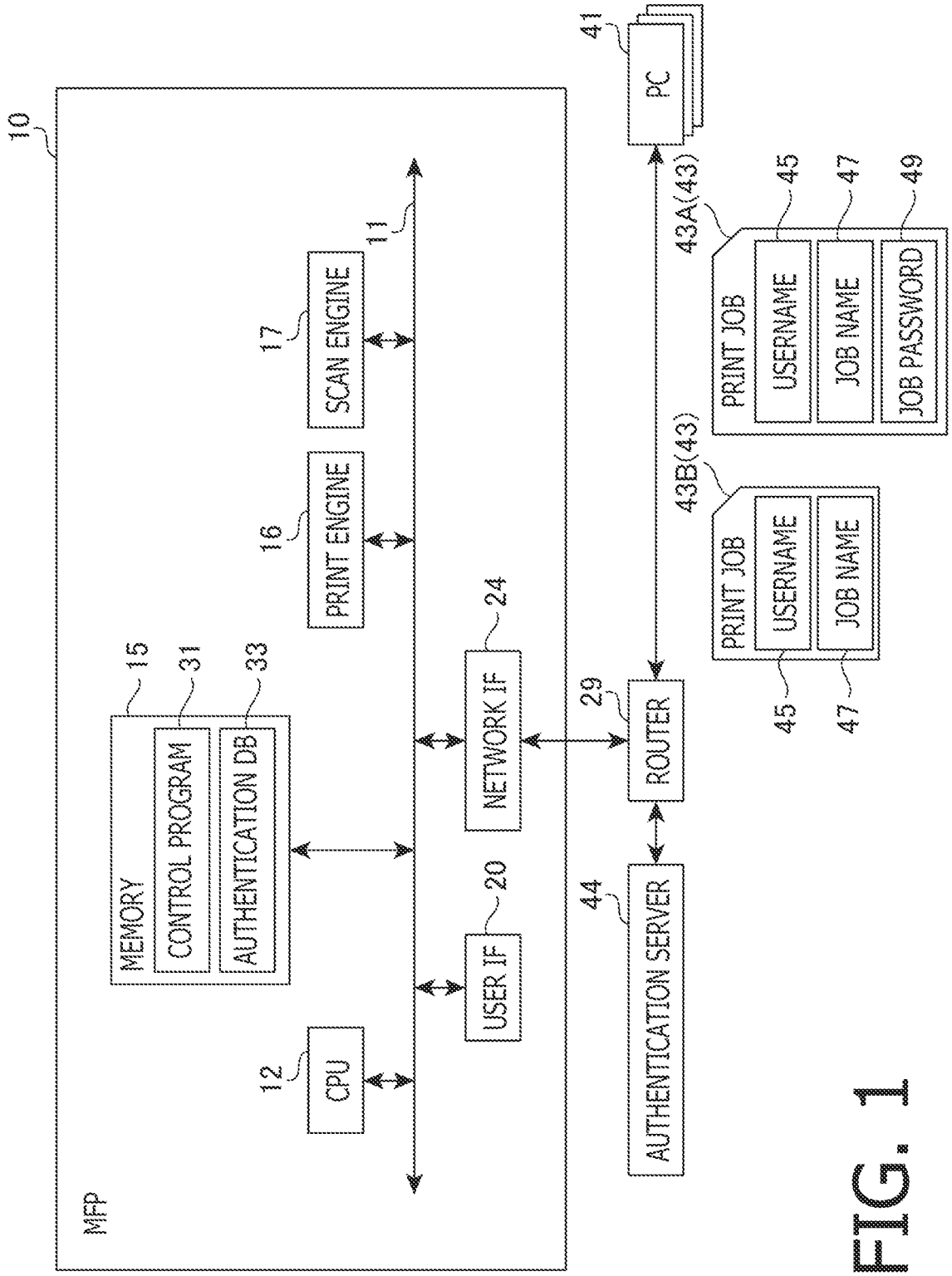
FIG. 1 is a block diagram showing an electrical configuration of an MFP.

FIG. 1 is a block diagram showing an electrical configuration of the MFP 10.

The MFP 10 is a multi-function peripheral having print, copy and scan functions. As shown in FIG. 1, the MFP 10 has a CPU 12, a memory 15, a print engine 16, a scan engine 17, a user IF (abbreviation for "interface") 20, and a network IF 24. The above components are communicably interconnected via a bus 11. It is noted that the CPU 12 is an example of a controller according to aspects of the present disclosures.

The memory 15 is configured, for example, as a combination of a RAM, a ROM, an NVRAM, an HDD, an SSD, and the like. The memory 15 is configured to store various programs including a control program 31. The control program 31 is, for example, firmware configured to integrally control respective components of the MFP 10. The CPU 12 is configured to control respective components connected to the bus 11 by executing the control program 31.

The control program 31 includes an EWS (Embedded Web Server) program that functions as a Web server. By executing the EWS program, the CPU 12 causes the MFP 10 to function as the Web server. Further, an authentication DB (abbreviation for "database") 33 is constructed in the memory 15.

In the following description, the MFP 10 executing the control program 31 with the CPU 12 may be described simply by the name of a device. For example, the description "the MFP 10 receives an operation input to the user IF 20" may mean "the MFP 10 executes the control program 31 with the CPU 12 and controls the user IF 20 to receive the operation input through the user IF 20."

A medium that stores the control program 31 and the authentication DB 33 is not necessarily limited to the ROM, the RAM, the HDD, and the like built into the MFP 10, but can also be a computer-readable storage medium. The computer-readable storage medium is a non-transitory medium. The non-transitory medium includes storage media such as CD-ROM, a DVD-ROM, and other storage media in addition to the above examples. Further, the non-transitory medium is also a tangible medium. On the other hand, an electrical signal carrying a program downloaded from a server on the Internet or the like is a computer-readable signal medium, which is a type of a computer-readable medium, but is not included in the non-transitory computer-readable storage.

The print engine 16 is configured to print images on sheets (e.g., recording sheets, OHP sheets, and the like). The print engine 16 may be configured to perform printing using an inkjet method or an electrophotographic method. The scan engine 17 is equipped with a read sensor (e.g., CIS or CCD) or other device configured to read images from a document, and controls the read sensor to read images of the document. The user IF 20 is equipped with, for example, a touch panel and pushbuttons to receive user operational input, and a display to display information to the user. The network IF 24 is, for example, a LAN interface and is connected to the PC 41 via a router 29. Communication between the MFP 10 and the PC 41 may be wired or wireless. Further, the network connecting the MFP 10 and the PC 41 may be either a LAN or a WAN.

In the present embodiment, multiple PCs 41 are connected to the router 29. The user of one of the PCs 41 may transmit a print job 43 from the PC 41 to the MFP 10 by operating the PC 41. The MFP 10 then executes a printing process according to the print job 43 received from the PC 41. It is noted that the device that transmits the print job 43 to the MFP 10 is not necessarily limited to the PC 41, but can be any other terminal devices which can perform information-processing. Examples of such terminals may include smartphones, tablet terminals, and the like. In the following description, the print job 43 that contains a username 45 and a job password 49 will be referred to as a job 43A, while the print job 43 that contains a username 45 and does not contain a job password 49 will be referred to as a job 43B. When jobs 43A and 43B are referred to collectively, they are referred to as the print job(s) 43. Further, the job 43A may also be referred to as a "password-associated job."

FIG. 2 shows an example of the print job 43 which is described in the PJL (printer job language). In the example shown in FIG. 2, a header of a print job 43 contains commands to set variables (such as JOB_NAME) in the order of a job name 47, a username 45, a job password 49, a transmission time, and a description language type. The job name 47 is, for example, a name of the print job 43 assigned by the printer driver executed on the PC 41. Further, the printer driver executed on the PC 41 sets, for example, a username that is used for logging into the PC 41 as the username 45 to the print job 43, and transmits the same to the MFP 10. It is noted that the username 45 is an example of a user identification information according to aspects of the present disclosures. The job password 49 is an example of authentication information according to aspects of the present disclosures. By analyzing the print job 43 shown in FIG. 2, the MFP 10 can determine whether the username 45, job password 49, and the like are set in the print job 43. When a printer language other than the PJL is used, the MFP 10 can similarly detect the setting status of the username 45, and the like, by examining the content defined in the used language.

FIG. 3 shows an example of data stored in the authentication DB 33. As shown in FIG. 3, for example, the username 51, the login password 52, a print authority flag 53, a scan authority flag 54, and a copy authority flag 55 are associated with each other and registered as one record in the authentication DB 33. The username 51 is an example of user identification information according to aspects of the present disclosures, and is identification information indicating a user who is allowed to log in to the MFP 10. In the authentication DB 33 in the example shown in FIG. 3, five usernames, i.e., "public user (PUBLIC)," "inoue," "kato," "hayashi," and "minami" are registered. The public user is a user other than those registered in the authentication DB 33 who are allowed to log in to MFP 10, and is sometimes referred to as a "guest user." The login password 52 is the password required for authentication when logging in with the associated username 51. The username 51 and the login password 52 are set, for example, by a system administrator who manages the MFP 10.

The print authority flag 53, the scan authority flag 54, and the copy authority flag 55 are flags that define whether or not each user is granted the authority to perform the print, scan, and copy functions provided by the MFP 10. In the example shown in FIG. 3, the username "inoue" is granted the print and scan authorities, but is not granted the copy authority. That is, when "inoue" logs into the MFP 10 and becomes a logged-in user, the MFP 10 basically executes the processes related to the print and scan functions, but not the copy function. Since the same authorities are set for public users, the MFP 10 basically executes processes related to the print and scan functions, but not the copy function, when the MFP 10 is in a logout state where no one is logged in.

The MFP 10 can accept the settings of the authentication DB 33 with the EWS. The system administrator operates a Web browser on the PC 41 to access the EWS of the MFP 10, which requests the Web browser to return the administrator password and determines whether the returned password is the correct administrator password. If the returned password is the correct administrator password, the EWS 10 replies to the Web browser with Web page data indicating a page for a setup operation (hereinafter, referred to as a "setup page"). The system administrator operates the user IF of the PC 41 to set up the authentication DB via the setup page. The MFP 10 receives information indicating the contents of the operations via the setup page from the web browser, and sets the authentication DB 33 based on the received information. That is, each data in the authentication DB 33 is stored in the memory 15. Further, the MFP 10 also accepts operations to indicate whether the authentication mode should be turned ON or OFF, whether the first or second authentication mode should be selected, or other operations via the web page provided by the EWS, and stores the setting information in the memory 15 in accordance with the received operations. The authentication DB 33 is used when the first authentication mode is ON.

The method of setting the authentication mode and the authentication DB 33 is not necessarily limited to the method using the Web server as described above. For example, the MFP 10 may store the setting information of the authentication mode and the authentication DB 33 in the memory 15 in accordance with the operation input to the user IF 20. In such a case, it is preferable to have a checking procedure to check whether the operator is the correct administrator, such as a procedure of requiring the operator to input the correct administrator password. Further, based on the instruction data received by a method other than the EWS or based on the instruction data stored in a USB memory attached to the MFP 10, the authentication mode setting information and the authentication DB 33 may be stored in the memory 15.

When the MFP 10 is instructed by instruction data received by a method other than the EWS or instruction data stored in the USB memory attached to the MFP 10 to allow the MFP 10 to accept operation input, the MFP 10 may be configured to accept operation input via the EWS or the user IF 20. The data items in the authentication DB 33 shown in FIG. 3 are merely an example. When the MFP 10 is equipped with a facsimile function, for example, the authentication DB 33 may include a flag value representing that the user is granted the authority to execute the facsimile function. Alternatively, the authentication DB 33 may include not only information on the grant or denial of the function, but may also have values that substantially restrict the execution of the function, for example, a value that limits the number of sheets printed by each user. The print authority flag 53, the scan authority flag 54, and the copy authority flag 55 in the authorization DB 33 are examples of the authorization information according to aspects of the present disclosures.

Figure 9:
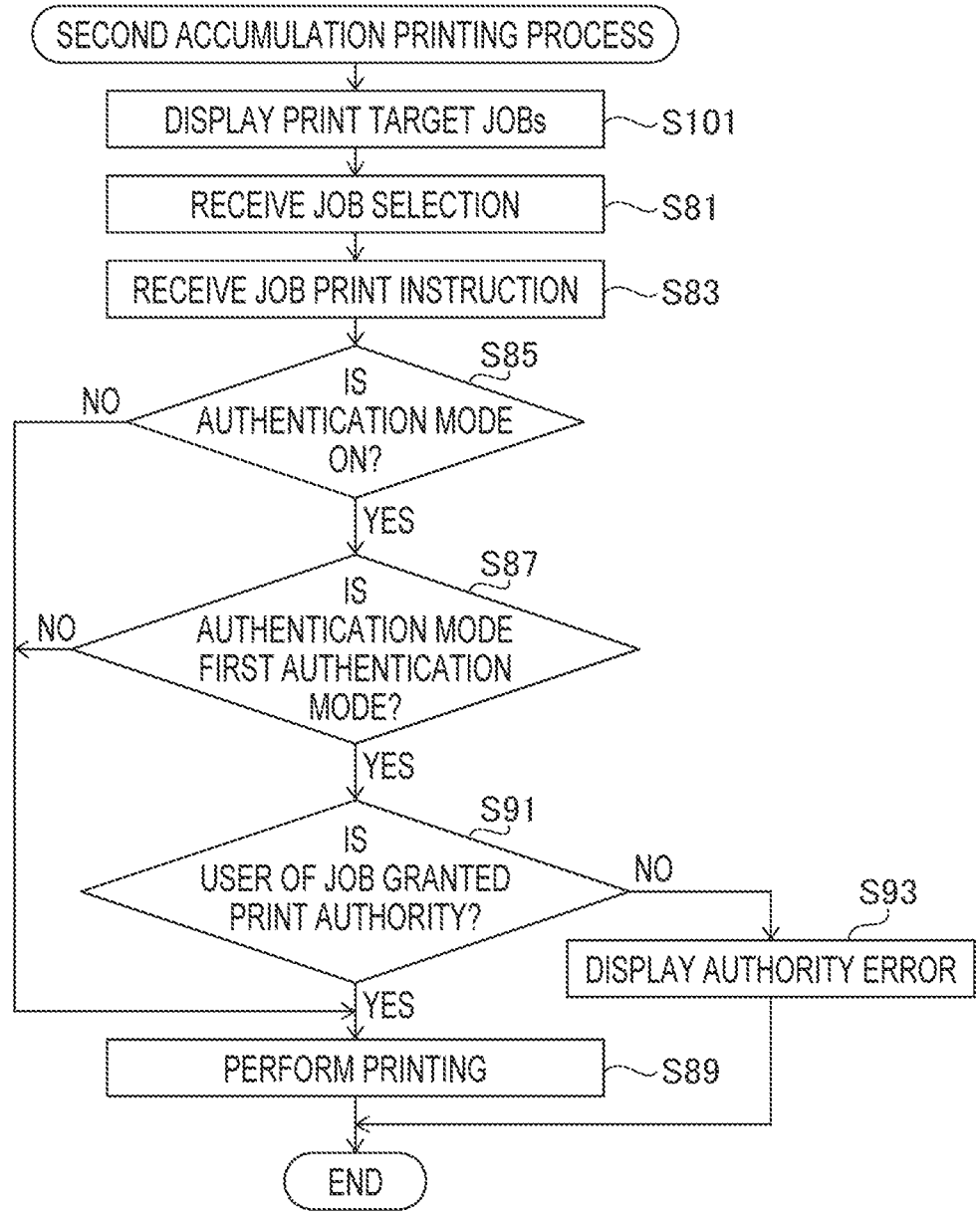
FIG. 9 is a flowchart illustrating a second accumulation printing process.

The MFP 10 determines whether or not the received print job 43 is to be subject to the accumulation printing process based on the data set in a header of the received print job 43, the data stored in the authentication DB 33, and the setting information about the functions related to the execution of the second accumulation printing process (hereinafter referred to as a second accumulation printing process function) as will be described below with reference to FIG. 9. For example, the MFP 10 determines whether the second accumulation printing process function is ON or OFF, whether the authentication mode is ON or OFF, whether the first or second authentication mode is selected, whether the username 45 included in the print job 43 is registered in the authentication DB 33, whether the username indicates the name having the print authority, whether the print job 43 includes a job password 49, and many other conditions are examined to determine whether the print job 43 is to be subject to the accumulation printing.

The MFP 10 accumulates the print jobs 43 that are subject to the accumulation printing. Concretely, the MFP 10 generates print data in raster format, for example, based on the print job 43, and stores the generated print data in the memory 15 by associating the generated print data with the data set in the header of the received print job 43. It is noted that the "accumulation printing" can be rephrased as a "storage printing." As the print data, the data set in the header of the received print job 43 is set. The data associated with the print data may be of a format different from the header of the 43 print job. Further, an external memory (storage), such as a USB memory stick or an HDD connected to the MFP 10, may be used to accumulate the print data. For the sake of expediency, the term "memory" 15 will henceforth be used as a concept that also includes external memory (storage). Further, for the sake of expediency, the description "print job" hereafter may refer to print data stored in the memory 15. Furthermore, instead of generating print data based on the print job 43, the print job 43 itself may be accumulated as the print data.

The MFP 10 determines whether to print or discard a print job that is not subject to accumulation, based on the data set in the header of the received print job 43, the data stored in the authentication DB 33, and the setting information about the second accumulation printing process function. The MFP 10 prints the print data based on the print job 43 that is determined to be printed. On the other hand, the MFP 10 discards the print job 43 that is determined to be discarded, without accumulating or printing the same.

It is noted that the above determination may be based on at least one of the data set in the header of the received print job 43, the data stored in the authentication DB 33, and the setting information about the second accumulation printing process function, rather than based on all of them. Further, the conditions for determining which print jobs 43 are to be accumulated or discarded are not necessarily limited to the above conditions.

Figure 8:
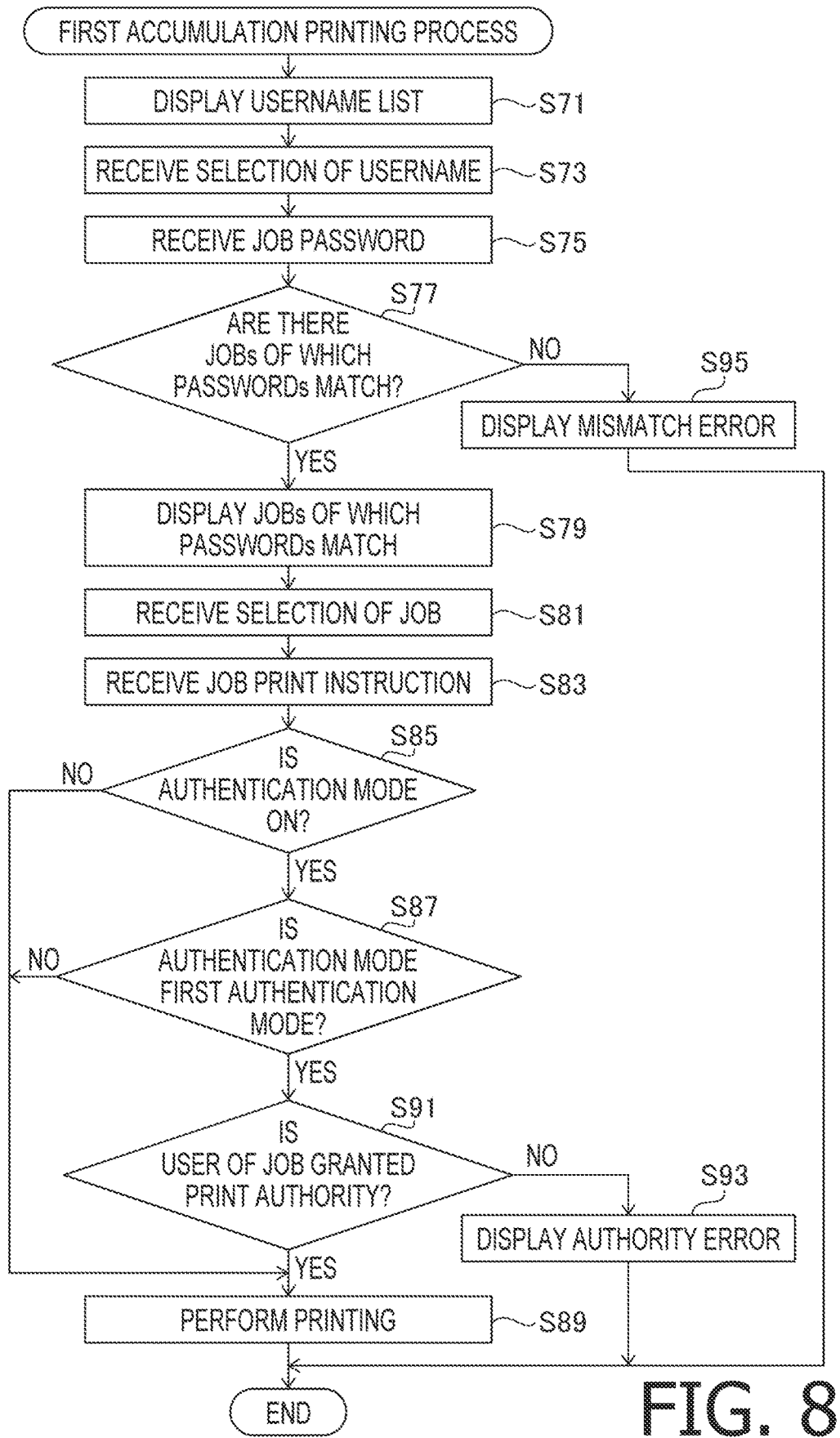
FIG. 8 is a flowchart illustrating a first accumulation printing process.

The MFP 10 may determine whether the print job 43 is to be accumulated or discarded by replacing or combining any of the above conditions with the ON/OFF condition of the function to execute the first accumulation printing process shown in FIG. 8.

Figure 4:
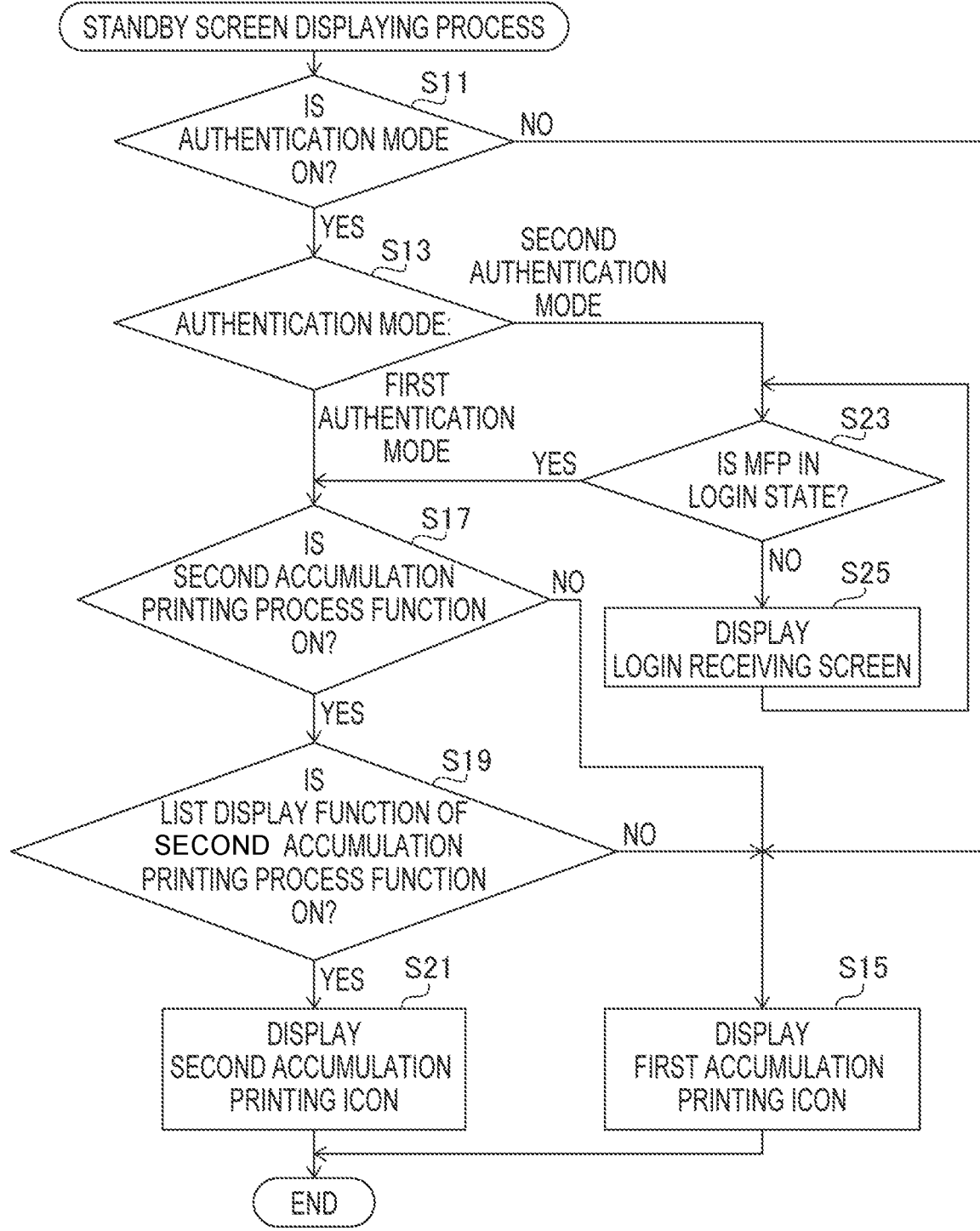
FIG. 4 is a flowchart illustrating a standby screen displaying process.

Next, the standby screen displaying process executed by the MFP 10 is described. FIG. 4 is a flowchart illustrating the standby screen displaying process. The MFP 10 executes, for example, the process shown in FIG. 4 when the MFP 10 is powered on, the control program 31 is executed to start up the system, and the standby screen is displayed on the user IF 20. The conditions to be satisfied in order to perform the process in FIG. 4 are not necessarily limited to the display of the standby screen at the time of startup. For example, the MFP 10 may perform the process shown in FIG. 4 when the MFP 10 operates in a power-saving mode so that the user IF 20 does not display any image, and thereafter the power-saving mode is released and the image is displayed on the user IF 20 again. Alternatively, the MFP 10 may perform the process shown in FIG. 4 when the MFP 10 returns the display on the user IF 20 to the standby screen after performing some function such as the print function.

It is noted that the processes in the flowcharts (FIG. 4, FIG. 6 to FIG. 9) and the sequence diagram (FIG. 5) described below are basically the processes of the CPU 12 according to instructions described in the control program 31. That is, the processes of "determining," "displaying," "selecting," and the like in the following description refer to the processes performed by the CPU 12. Further, the processes performed by the CPU 12 include hardware control.

It is also noted that the "data" in this specification is represented by computer-readable bit strings. Data that has the same substantive semantic content but a different format are treated as the same data. The same applies to "information" in this specification. The concept of "instructing" indicates that information indicating that an instruction is being given is output to another device, component, or the like. It is further noted that information indicating that one is giving an instruction is also described simply as "instruction." Furthermore, in the determination process by the MFP 10, "when A is B" means "when A is determined to be B."

When the standby screen displaying process shown in FIG. 4 is started, the MFP 10 determines, in S11, whether the authentication mode is ON based on the setting information stored in the memory 15. When the authentication mode is ON (S11: YES), the MFP 10 determines which of the first authentication mode and the second authentication mode is set (S13). When the first authentication mode is set (S13: first authentication mode), the MFP 10 determines whether the second accumulation printing process function is ON or not (S17). The first authentication mode is the mode in which login authentication is performed using the authentication DB 33. Furthermore, the first authentication mode is a mode that determines which functions are allowed to be used by the logged-in user based on the authentication DB 33. When the second accumulation printing process function is ON (S17: YES), the MFP 10 executes S19.

In S19, the MFP 10 determines whether or not a list display function of the second accumulation printing process function is turned ON based on the setting information for the second accumulation printing process function stored in the memory 15 (S19). The second accumulation printing process function is a function of printing jobs for which the username 45 of the logged-in user has been set among the accumulated print jobs 43. As will be described later, when the second accumulation printing process function is turned ON, the second accumulation printing process shown in FIG. 9 can be performed, depending on other conditions. The list display function is a function to display a list of print jobs 43 accumulated in the memory 15 and print the print job 43 selected by the user operation via the user IF 22. The list display function is an example of a login user data list mode according to aspects of the present disclosures.

As well as the setting information regarding the authentication mode, the MFP 10 stores the setting information regarding the second accumulation printing process function in the memory 15 according to the operation by the system administrator, which operation is received via the EWS. It is noted that the operation by the system administrator may be received via the user IF 20. Alternatively, the setting information may be stored in the memory 15 based on instruction data received by a method other than the EWS or instruction data stored in a USB memory attached to the MFP 10. Furthermore, the MFP 10 may be configured to receive operation input via the EWS or operation input via the user IF 20 when instructed to allow receipt of the operation input regarding the setting information of the second accumulation printing process function by the instruction data received by a method other than the EWS or the instruction stored in the USB memory attached to the MFP 10.

When the list display function is ON (S19: YES), the MFP 10 displays the second accumulation printing icon on the standby screen (S21), and terminates the process shown in FIG. 4. On the other hand, when the second accumulation printing process function is OFF (S17: NO), the MFP 10 displays the first accumulation printing icon on the standby screen (S15) and terminates the process shown in FIG. 4.

Figure 5:
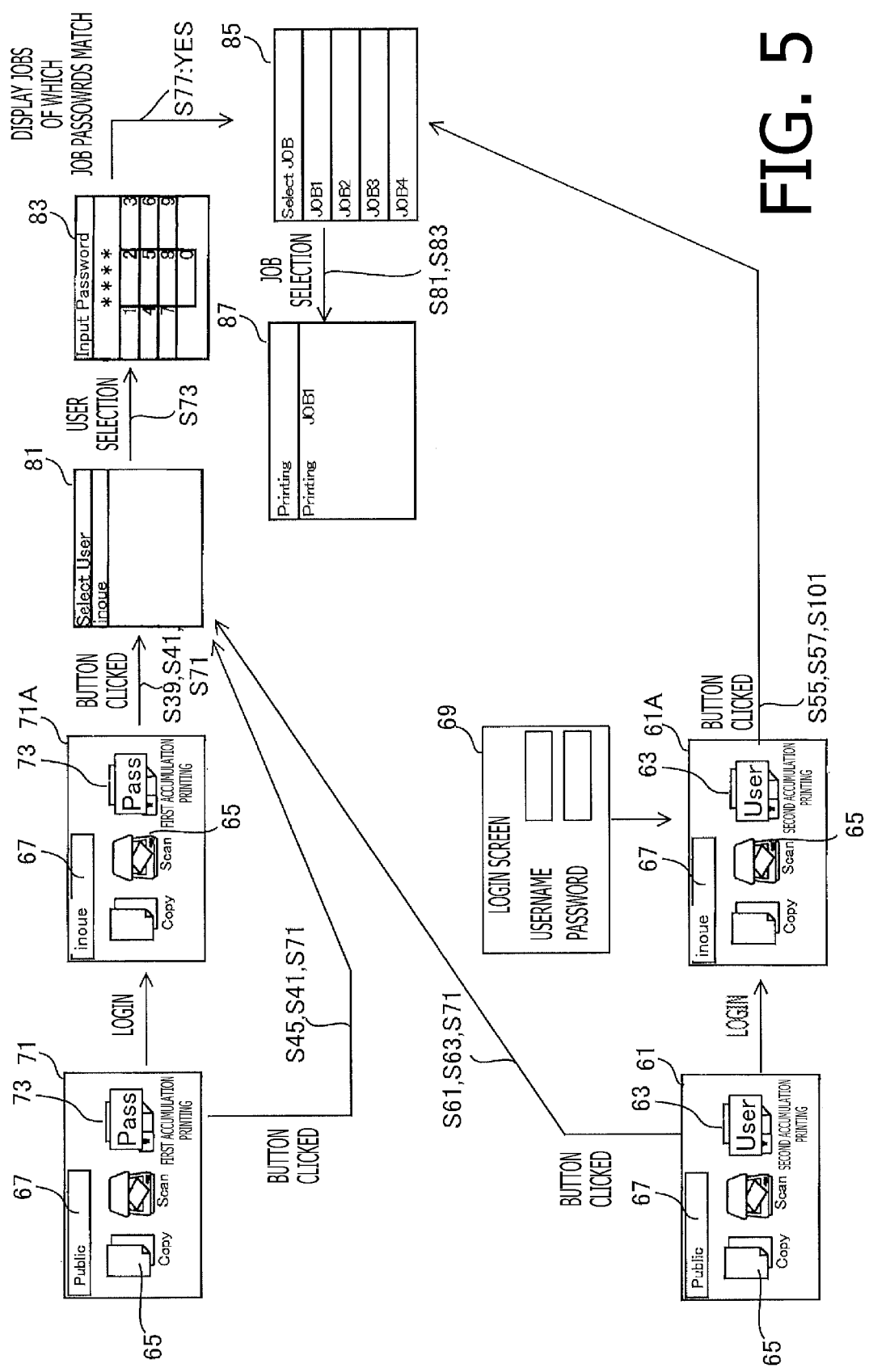
FIG. 5 is a diagram showing transition of the status of the display screen on a user IF when first and second accumulation printing icons are clicked.

FIG. 5 shows state transitions of the display screen of the user IF 20. The MFP 10 displays a function icon 65 for selecting the copy function, scan function and the like, and a second accumulation printing icon 63 on the standby screen 61. The standby screen 61 shows a logout state where nobody is logged in. It is noted that the MFP 10 displays an indication of a public user in a user display field 67 on the standby screen 61.

On the other hand, when the list display function is OFF (S19: NO), the MFP 10 displays the first accumulation printing icon 73 on a standby screen 71 (see FIG. 5) of the user IF 20 in S15, and terminates the process shown in FIG. 4. The standby screen 71 is similar to the standby screen 61, except that the first accumulation printing icon 73 is displayed instead of the second accumulation printing icon 63.

When the second authentication mode is set (S13: second authentication mode), the MFP 10 determines, in S23, whether or not the user is logged in (i.e., whether the MFP 10 is in the long in the state). The second authentication mode is a mode in which the authentication is performed using an authentication server. The authentication server in this case is, for example, an Active Directory (registered trademark of Microsoft Corporation) server. As shown in FIG. 1, for example, an authentication server 44 is connected to the router 29. The authentication server 44 centrally manages hardware resources on the connected network and information on users who use the hardware resources. Concretely, for example, the authentication server 44 manages the usernames and passwords of the users who can use the hardware resources.

For convenience, with respect to the second authentication mode, the authentication using the authentication server 44 will be described as "login authentication," an operation to be authenticated using the authentication server 44 will be described as a "login operation," a state being authenticated will be described as "logged in," the authenticated state of the user will be described as a "logged-in state," and the unauthenticated state will be described as a "logged-out state."

When operating in the second authentication mode, the MFP 10 does not receive any operations other than the login operation via the user IF 20 until the authentication by the authentication server 44 is successful. When the MFP 10 is not in the login state (S23: NO), the MFP 10 displays a login receiving screen 69 (see FIG. 5) on the user IF 20 to receive the login operation (S25). When the MFP 10 receives the username and the password via the login receiving screen 69, the MFP 10 requests the login authentication from the authentication server 44 using the entered username and password. When the login authentication is successful (S23: YES), the MFP 10 proceeds to S17 to display the first accumulation printing icon 73 or the second accumulation printing icon 63 on the standby screen according to whether the second accumulation printing process function is turned ON or OFF and whether the list display function is ON or OFF (S15 or S21), and terminates the process shown in FIG. 4. It is noted that the above-described control details in the second authentication mode are only an example according to aspects of the present disclosures.

Therefore, when the MFP 10 is in the logout state in the second authentication mode (S23: NO), the MFP 10 displays the login receiving screen 69 on the user IF 20 and does not perform a list process and display of the jobs 43A and 43B (hereinafter referred to as list display) in FIG. 6 onward as described below. In this way, when the MFP 10 is in the second authentication mode, the display of the accumulated print jobs 43 and the printing of the displayed print jobs 43 can be restricted until the authentication by the authentication server 44 is completed.

When the first authentication mode is set, if the user performs a touch operation in the user display field 67 on the standby screen 61 in the logout state or on the standby screen 71, the MFP 10 displays a list of the usernames 51 registered in the authentication DB 33 on the user IF 20 and receives the selection of the user to log in. When a username 51 is selected, the MFP 10 displays a generally-used input screen for entering the login password 52 for the selected username 51. When the entered login password matches the login password 52 (i.e., the password for the selected user) registered in the authentication DB 33, the MFP 10 determines that the authentication was successful, and the MFP 10 is in the login state where the user with the selected username 51 is logged in. The MFP 10 displays the standby screen 61A or the standby screen 71A after the login, with the name of the user who successfully logged in displayed in the user display field 67 (in the example shown in FIG. 5, the user name "inoue" is shown).

When the second authentication mode is set, the MFP 10 may be configured not to execute S22 or S25, but to execute S17-S21 and display the standby screen 61 or the standby screen 71 in the logout state as in a case where the first authentication mode is set. In this case, when the user display field 67 on the standby screen 71 is touched, the MFP 10 may execute a process similar to S25 to enter the login state and display the standby screen 61A or the standby screen 71A after the login. When the second accumulation printing process function is ON and the list display function is OFF, all the print jobs with the same username 45 as the username 51 of the logged-in user among the print jobs 43 accumulated in the memory 15 at the time of the successful login authentication are printed. When the print authority is not granted to the logged-in user, printing may not be performed.

Next, a first accumulation printing icon click process to be executed when the first accumulation printing icon 73 is clicked is described with reference to FIG. 6. When the MFP 10 detects that the first accumulation printing icon 73 is clicked, the MFP 10 determines in S31 whether the authentication mode is ON. When the authentication mode is ON (S31: YES), the MFP 10 determines whether the MFP 10 is in the login state (S33). When a particular user is logged in in the first or second authentication mode (S33: YES), and if there is a print job 43A, among the print jobs 43 stored in the memory 15, to which a job password 49 is set and a username 45 same as the username 51 of the logged-in user is set (S35: YES), the MFP 10 executes the list process for the corresponding job 43A (S39) and then executes the first accumulation printing processing (S41). The list process referred to here is, for example, a process of generating a list of target print jobs 43 and storing the list in the memory 15.

Hereafter, a print job to which the same username 45 as the username 51 of the logged-in user is set is referred to as a "print job of a logged-in user" for convenience. That is, the job 43A, for which a job password 49 is set and a username 45 the same as the username 51 of the logged-in user is set, is a print job of the logged-in user, and is also a password-associated job.

When the authentication mode is OFF (S31: NO) or when the authentication mode is ON but the MFP 10 is in the logout state (S33: NO), the MFP 10 determines whether jobs 43A with job passwords 49, that is, password-associated jobs 43A are accumulated or not (S43). As described above, if the second authentication mode is configured not to accept any user operation other than the login operation until the MFP 10 is in the login state, then when the second authentication mode is set, the first accumulation printing icon 73 cannot be operated. Therefore, a negative decision is not made in S33. When the password-associated jobs 43A are accumulated (S43: YES), after performing the list process for all the password-associated jobs 43A (S45), the MFP 10 executes S41. When the MFP 10 is in the login state and no job 43A, which is a password-associated job and the job of the logged-in user, is stored (S35: NO), or when the authentication mode is OFF, or when the authentication mode is ON but the MFP 10 is in the logout state (S43: NO), the MFP 10 displays a message on the user IF 20 indicating that there are no print jobs 43 to list (S47), and terminates the process shown in FIG. 6.

Next, a second accumulation printing icon click process that is executed when the second accumulation printing icon 63 is clicked is described with reference to FIG. 7. When the MFP 10 detects that the second accumulation printing icon 63 is clicked, the MFP 10 determines whether the logged-in user's print job 43 is accumulated in the memory 15 (S53) if the MFP 10 is in the login state (S51: YES). When the print jobs 43 of the logged-in user are accumulated in the memory 15 (S53: YES), the MFP 10 executes the list process for the print jobs 43 of the logged-in user (S55) and then executes the second accumulation printing process (S57).

When the MFP 10 is in the logout state (S51: NO), if the password-associated jobs 43A are stored (S59: YES), the MFP 10 performs the list process (S61) for the password-associated jobs 43A for which the usernames 45 of unregistered users have been set among the password-associated jobs 43A accumulated in the memory 15 (S61). When the MFP 10 is in the first authentication mode, the MFP 10 performs the list process for the password-associated job 43A of the usernames 45 that are not registered in the authentication DB 33 among the accumulated print jobs 43. When the MFP 10 is in the second authentication mode, the MFP 10 performs the list process for the password-associated jobs 43A of the stored print jobs 43 with user names 45 that are not registered with the authentication server 44. After executing S61, the MFP 10 executes the first accumulation printing process (S63). When the MFP 10 is in the login state and no print job 43 for the logged-in user has been accumulated (S53: NO), or when the MFP 10 is in the logout state and no password-associated job 43A has been accumulated in the memory 15 (S59: NO), the MFP 10 displays a message indicating that there are no print jobs 43 to be listed is displayed on the user IF 20 (S65), and terminates the process shown in FIG. 7.

The first accumulation printing process (S41, S63) in FIG. 6 and FIG. 7 will be described with reference to FIG. 5 and FIG. 8. When starting the first accumulation printing (AC-CUMULATION PRINTING) process, MFP 10 displays a list of all the usernames 45 set in the jobs included in the list created by the list process (S71). When the MFP 10 is in the login state, only the password-associated jobs 43A of the logged-in users were subjected to the list process in S39 of FIG. 6, and therefore, in S71, the MFP 10 displays the user selection screen 81 with only usernames of the logged-in users (in the example shown in FIG. 5, only the username "inoue" is displayed).

Figure 6:
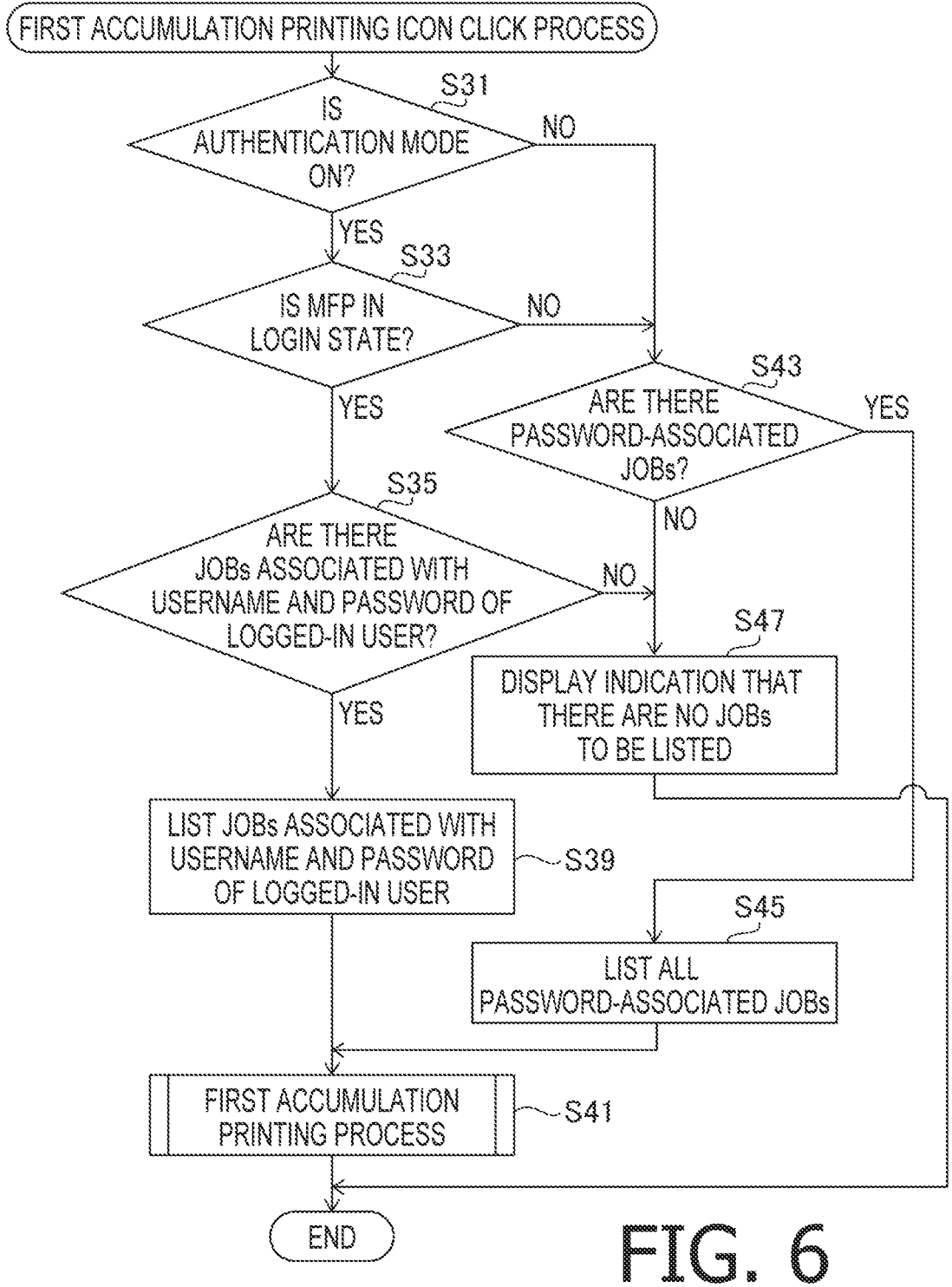
FIG. 6 is a flowchart illustrating a first accumulation printing icon click process.

On the other hand, when the MFP 10 is in the logout state, the MFP 10 lists the usernames 45 set for the print jobs 43 subject to the list process in S45 of FIG. 6, that is, the usernames 45 set for all the accumulated password-associated jobs 43A are displayed on the user selection screen 81. Alternatively, when the MFP 10 performs the list process in S61 of FIG. 7 when in the logout state, the MFP 10 displays the usernames 45 of the unregistered users, who are the users not registered in the authentication DB 33, of the accumulated password-associated jobs 43A on the user selection screen 81. The user selection screen 81 shown in FIG. 5 is an example of a case where only the username "inoue" is displayed, but when multiple usernames 45 are detected, the user selection screen 81 will display multiple usernames 45, such as "inoue" and "hayashi" for registered users, "horita" for unregistered users who are not registered in the authentication DB 33 will be displayed.

When any of the 45 usernames displayed, in S71, on the user selection screen 81 is selected (S73), the MFP 10 displays a password reception screen 83 (see FIG. 5), which receives a job password 49 (S75). When receiving the job password 49 on the password reception screen 83, the MFP 10 determines whether there exists a password-associated job 43A with the job password 49 that matches the job password received in S75 among the password-associated jobs 43A to which the username 45 selected in S73 is set (S77).

It is noted that when S41 is executed after S39 in FIG. 6, the usernames displayed on the user selection screen 81 are limited to those of the logged-in user, even if S71 is executed. Therefore, in such a case, the MFP 10 may display the password reception screen 83 (S75) without displaying the user selection screen 81 (S71), assuming that the username of the logged-in user has been selected.

When there exist password-associated jobs 43A of which job passwords match the job password 49 (S77: YES), the MFP 10 displays a list of password-associated jobs 43A of which job passwords match the job password 49 on the job list screen 85 (see FIG. 5) (S79). Then, the MFP 10 receives the selection of the password-associated job 43A to be printed from the job list screen 85 (S81). On the job list screen 85, the job names 47 stored in the memory 15 associated with the print jobs 43 at the time of accumulation are displayed. That is, when there are multiple password-associated jobs 43A of which the job passwords match the job password input in S75 are set, the MFP 10 displays all the password-associated jobs 43A having the matching job passwords on the job list screen 85. When the password-associated job 43A is selected (S81), the MFP 10 displays a message such as "Do you want to perform printing?" on the user IF 20 and receives a print instruction (S83). When the authentication mode is OFF (S85: NO) or when the authentication mode is ON but the authentication mode is the second authentication mode (S85: YES, S87: NO), the MFP 10 performs printing of the selected password-associated job 43A (S89). The MFP 10 displays the print start screen 87, starts printing, and terminates the process in FIG. 8 (FIG. 6 or FIG. 7).

When the first authentication mode is ON (S85: YES, S87: YES), the MFP 10 determines whether the user with the username 45 set in the password-associated job 43A selected in S81 is granted the print authority in the authentication DB 33 (S91). When the print authority is granted (S91: YES), the MFP 10 executes printing (S89), while when the print authority is not granted (S91: NO), the MFP 10 displays a message on the user IF 20 indicating an authority error (S93), and terminates the process. It is noted that when S63 in FIG. 7 is executed, the password-associated job 43A for an unregistered user will be selected. In such a case, only when the public user in the authentication DB 33 has been granted the print authority, the MFP 10 makes an affirmative decision in S91 (S91: YES) and prints the selected password-associated job 43A.

Therefore, when the first authentication mode is ON and any user is a logged-in user (S39), the MFP 10 does not display a list for the usernames 45 of users whose authority information is not registered in the authentication DB 33 (S71). When the first authentication mode is ON and any user is a logged-in user, the MFP 10 does not display a list of password-associated jobs 43A for users whose authority information is not registered in the authentication DB 33 (S79). In this way, erroneous operations can be suppressed, and security can be improved.

Figure 7:
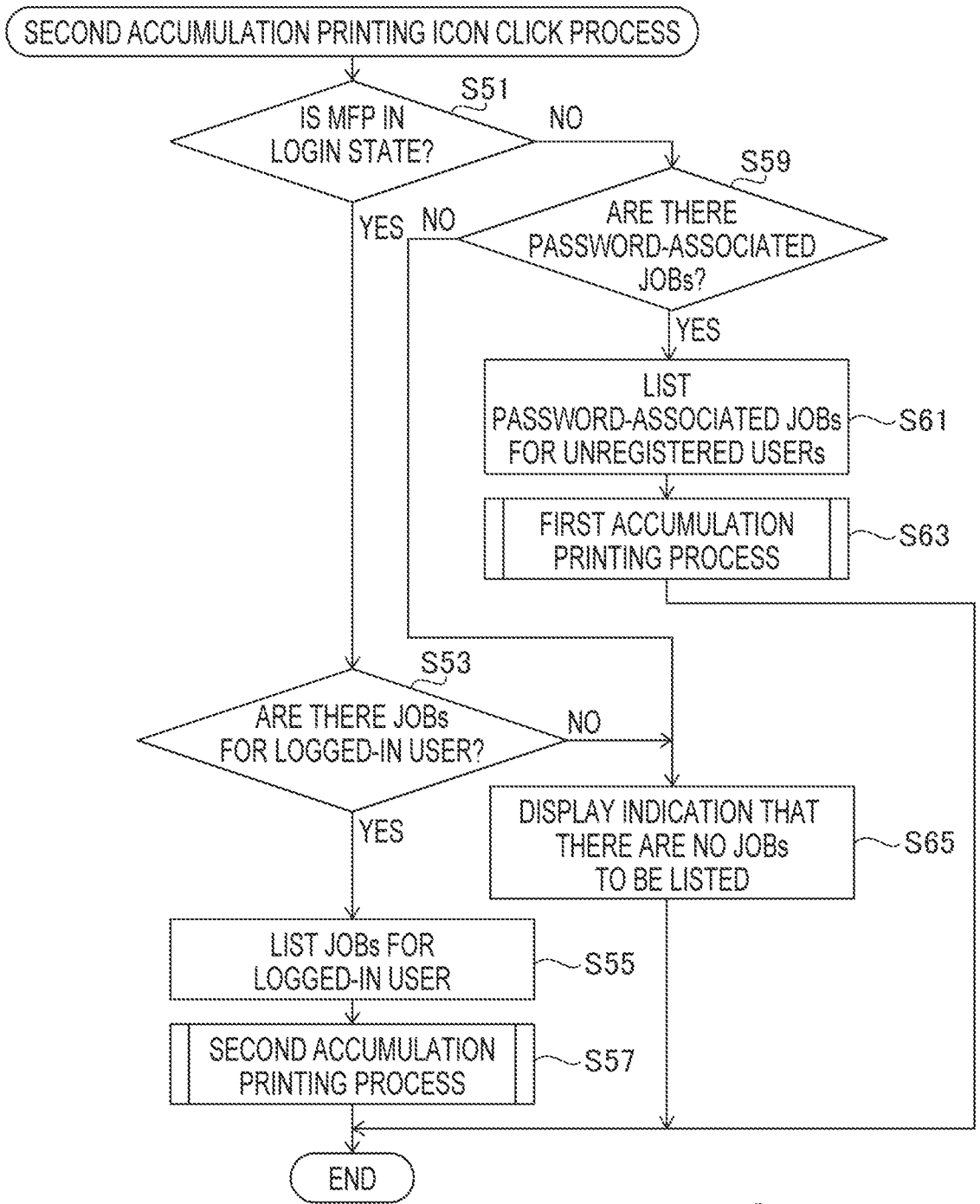
FIG. 7 is a flowchart illustrating a second accumulation printing icon click process.

Next, the second accumulation printing process of S57 in FIG. 7 is explained with reference to FIG. 5 and FIG. 9. In the following description, the same symbols are used for the same contents as those of the first accumulation printing process described above, and the explanation thereof will be omitted as appropriate. When starting the second accumulation printing process, the MFP 10 displays, in S101 of FIG. 9, a list of the jobs 43A and 43B to which the username of the logged-in user when S55 was executed is set from among the print job 43 to which the list process is applied in S55 (i.e., the accumulated print job 43). The MFP 10 receives the selection of the print job 43 to be printed on the job list screen 85 (S81), receives the print instruction (S83), and executes processing for the selected print job 43 (S85-S93) as in the first accumulation printing process. If the print job 43 selected in S81 of FIG. 9 is the password-associated job 43A for which a job password 49 is set, as in the first accumulation printing process, the MFP 10 may receive the job password 49 and may perform printing when both the job passwords 49 match.

Figure 10:
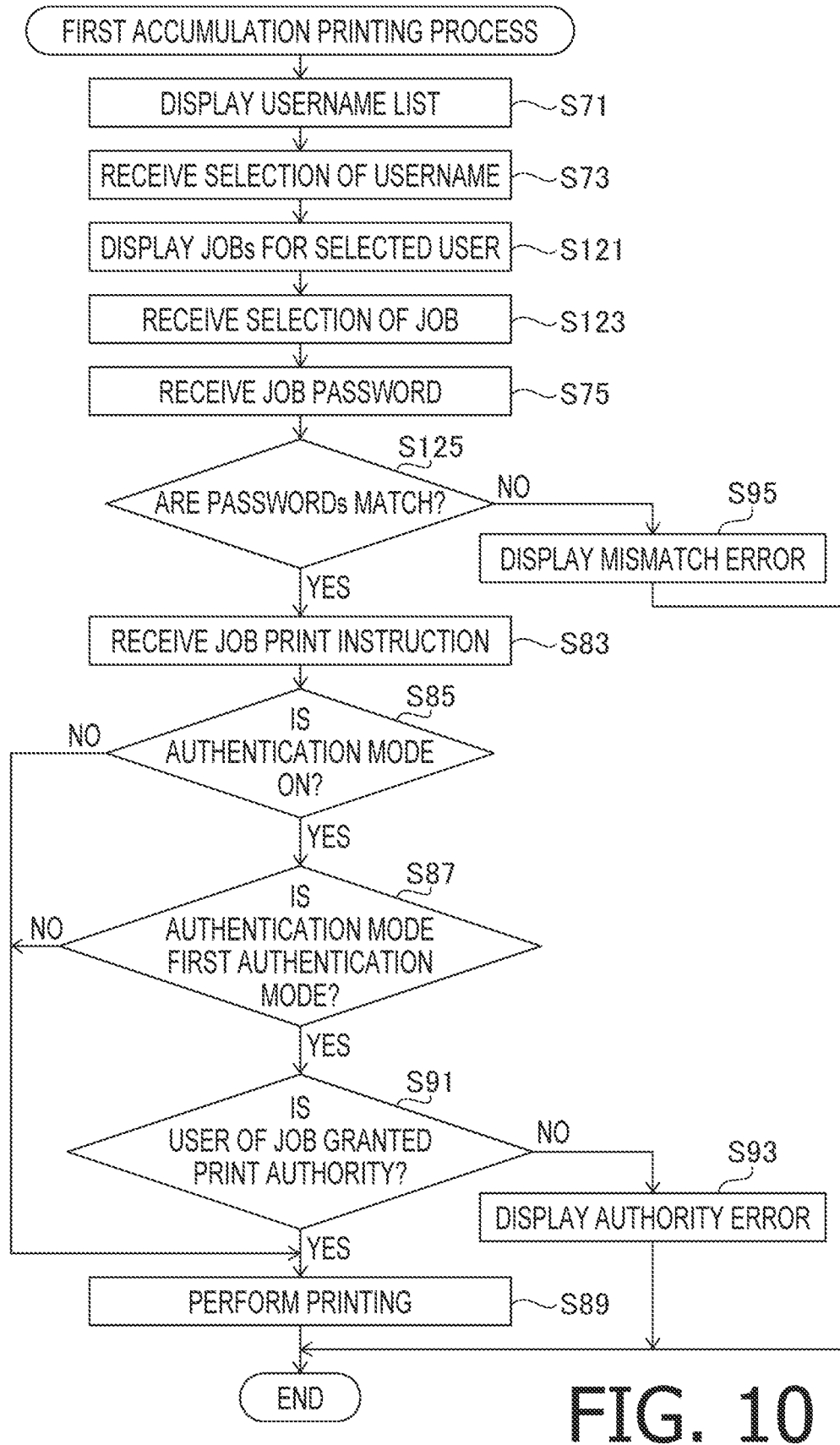
FIG. 10 is a flowchart illustrating a first accumulation printing process according to a modified embodiment.

Next, the first accumulation printing process according to a modified embodiment will be explained with reference to FIG. 10. In the following description of FIG. 10, the same reference numbers/symbols are used for the same contents as in the above-described embodiment and the description thereof will be omitted as appropriate.

When the username 45 displayed on the user selection screen 81 in FIG. 5 is selected (S73), the MFP 10 according to the modified embodiment displays the print jobs 43 corresponding to the selected username 45, that is, the password-associated jobs 43A corresponding to the selected username 45 are subject to display from among the accumulated password-associated jobs 43A.

As in the job list screen 85 in FIG. 5, the MFP 10 receives the selection of the password-associated job 43A to be printed from the displayed list of jobs (S123), and receives the job password 49 of the selected password-associated job 43A (S75). When the job password 49 of the selected password-associated job 43A matches the job password 49 received in S75 (S125: YES), the MFP 10 accepts the final print instruction (S83) and, as in the above-described embodiment, the MFP 10 performs printing (S85 onwards).

When the job password 49 of the selected password-associated job 43A does not match the job password 49 received in S75, the MFP 10 displays an error message (S95).

According to the above-described embodiments, the following effects are achieved.

In each embodiment, the display of print data based on the accumulated print jobs 43 can be performed according to the login state and the authentication mode.

According to the first accumulation printing process of the above-described embodiment shown in FIG. 8, the password-associated jobs 43A of which job passwords match the input job password can be printed collectively. On the other hand, in the second accumulation printing process according to the modified embodiment shown in FIG. 10, the password-associated jobs (43A) can be selected and printed individually.

When the first authentication mode is ON and a certain user (an example of the first user of the present disclosures) is a logged-in user (S31: YES, S33: YES), the MFP 10 does not display a list of the print jobs 43 to which the username 45 of a registered user (the second user of the present disclosures) different from the logged-in user whose authority information is registered in the authentication DB 33. In this way, only the password-associated jobs 43A of the logged-in user are listed, thereby suppressing the selection and printing of the print jobs 43 of other registered users. Further, by not printing the print jobs 43 of the others, the occurrence of information leakage due to printing can be suppressed and security can be improved.

When the first authentication mode is ON and the MFP 10 is in the logout state (S31: YES, S33: NO), the MFP 10 performs a list display of the password-associated jobs 43A for all users registered in the authentication DB 33 (S45, S71). In this way, when the MFP 10 is in the logout state, each registered user can input the job password 49 to perform printing.

When the first authentication mode is ON and the MFP 10 is in the logout state (S31: YES, S33: NO), the MFP 10 displays a list of the password-associated jobs 43A of a user who is not registered in the authentication DB 33 (an example of a third user of the present disclosures) (S45, S71). In this way, when the MFP 10 is in the logout state, an unregistered user can input the job password 49 to perform printing.

When the first authentication mode is OFF and the MFP 10 is in the logout state (S11: NO, S33: NO), the MFP 10 displays a list of the password-associated jobs (43A) of all the users, whether registered or not, in the authentication DB 33 (S45, S71). In this way, any of the registered and unregistered users can perform printing by entering the job password 49 when the first authentication mode is OFF and the MFP 10 is in the logout state.

When the first authentication mode is ON and the MFP 10 is in the login state (S31: YES, S33: YES), the MFP 10 displays a list of the password-associated jobs 43A of the logged-in users, receives the job password 49 set in the selected password-associated job 43A (S75), and receives an operation to select the password-associated job 43A to be printed (S81). When the user of the password-associated job 43A is granted the print authority (S91: YES), the MPF 10 performs printing. On the other hand, when the MFP 10 is in the second authentication mode and in the login state (S23: YES), the MFP 10 performs printing (S87: NO, S89) regardless of whether the user of the password-associated job (43A) is granted the print authority. In this way, when in the first authentication mode, printing can be performed according to the print authority, while when in the second authentication mode, printing can be performed according to the authentication by the authentication server 44.

When the first authentication mode is ON and the list display function is OFF (S19: NO), the MFP 10 displays the password-associated jobs 43A of the logged-in user and executes printing according to the print authority (S39, S91). On the other hand, when the first authentication mode is ON, the list display function is ON (S19: YES), and further, the MFP 10 is in the login state (S51: YES), the MFP 10 displays a list of 43 print jobs 43 (jobs 43A, 43B) to which the username 51 of the logged-in user has been set (S55). In this way, when the list display function is OFF and the MFP 10 is in the login state, only the 43A password-associated jobs of the logged-in user are listed, while when the list display function is OFF and the MFP 10 is in the login state, the print jobs 43 to which the username 51 of the logged-in user is set are listed.

When the first authentication mode is ON, the list display function is OFF, and the MFP 10 is in the logout state (S13: YES, S19: NO, S33: NO), the MFP 10 displays a list of the password-associated jobs of all the users (S45) and prints the same according to the print authority. On the other hand, when the first authentication mode is ON, the list display function is ON, and the MFP 10 is in the logout state (S13: YES, S19: YES, S51: NO), the MFP 10 does not display a list for the registered users registered in the authentication DB 33, but displays a list of the password-associated jobs 43A of the unregistered users (S61). Then, when an unregistered user's password-associated job 43A is selected, if the public user is authorized to print, the MFP 10 performs printing (S91: YES). In this way, when the list display function is ON and the MFP 10 is in the logout state, if the public user is granted the print authority, the unregistered user can print a password-associated job (43A) to which his/her username has been set while the MFP 10 is in the logout state.

While aspects of the present disclosures have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of aspects of the present disclosures, and not limiting the same. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the disclosures are provided below.

The technology of the present disclosures is not limited to printing apparatuses, but can be realized in various embodiments, such as a printing control method of controlling a printing apparatus, a computer program that realizes the functions of the above device or the above method, a non-transitory computer-readable recording medium containing computer-executable instructions realizing the computer program.

Although not specifically mentioned in the above embodiments, the login authentication information in the present embodiments may be only numbers, only letters, or a combination of numbers and letters. Further, the authentication using the authentication information in this application can be authentication using the information on a card for authentication, or biometric authentication such as fingerprints.

MFP 10 is equipped with the user IF 20, such as a touch panel, as a user interface for receiving login operations, but the MFP 10 may be configured to enable login operations by other means. The MFP 10 may determine whether to allow the login based on the data received from a mobile terminal. The user may perform the login operation by entering the username 51 and login password 52 on the mobile terminal and transmitting them to the MFP 10. In such a case, the wireless interface of the MFP 10 that executes communication with the terminal device is an example of a user interface according to aspects of the present disclosures.

In the above embodiments, a CPU 12 executing a predetermined program is employed as the controller according to aspects of the present disclosures. However, the controller is not necessarily limited to the CPU 12 as described. For example, the controller may be configured with dedicated hardware such as an ASIC. Further, the controller may be configured to operate in combination with, for example, software processing and hardware processing.

In the above embodiments, the MFP 10, a multifunction peripheral, is employed as the printing apparatus according to aspects of the present disclosures, but the printing apparatus is not necessarily limited to the MFP. The printing apparatus according to aspects of the present disclosures may be a printer device that has only a printing function.

What is claimed is:

1. A printing apparatus, comprising:
    a print engine;
    a network interface;
    a memory;
    a user interface; and
    a controller,
    wherein, when multiple pieces of print data are accumulated in the memory, the controller is configured to perform accumulation printing including:
        causing the user interface to display selectable items corresponding to the multiple pieces of print data accumulated in the memory;
        receiving, through the user interface, an operation to select print data to be printed from among the multiple pieces of print data for which corresponding selectable items are displayed through the user interface; and
        printing selected print data,
    wherein each piece of print data is based on a print job that is received through the network interface and set with user identification information indicating the user, the user identification information indicating:
        a user identified in the print job when the print data is based on the print job that identifies the user,
    wherein the printing apparatus is configured to be set to operate in a first authentication mode,
    wherein the first authentication mode is a mode in which the printing apparatus is capable of receiving a login operation through the user interface, and in which the printing apparatus determines a function to be allowed for a logged-in user based on authority information representing authority of the logged-in user which is stored in the memory in advance, the logged-in user being a user logged-in to the printing apparatus in the login operation to use, from among functions, the functions equipped to the printing apparatus,
    wherein the selectable items include selectable indications of print jobs, wherein, when the first authentication mode is set and a first user, whose authority information is registered in the memory, is the logged-in user, the controller is configured to cause, in the accumulation printing, the user interface to:
  display selectable indications of print jobs for the print data, among the print data accumulated in the memory, to which first user identification information and the authentication information are set, the first user identification information indicating the first user; and
not display the selectable indications of print jobs for the print data, among the print data accumulated in the memory, to which the first user identification information is not set,
wherein, when the printing apparatus is set to operate in the first authentication mode and the first user is the logged-in user, the controller is configured, in the accumulation printing, not to display selectable items for the print data, among the print data accumulated in the memory, to which second user identification information indicating a second user whose authority information is stored in the memory is set, the second user being different from the first user,
wherein, when the printing apparatus is set to operate in the first authentication mode and the first user is the logged-in user, the controller is configured to cause the user interface, in the accumulation printing, not to display selectable items for the print data, among the print data accumulated in the memory, to which third user identification information indicating a third user whose authority information is not stored in the memory and the authentication information are set.

2. The printing apparatus according to claim 1,
wherein, when the printing apparatus is set to operate in the first authentication mode and the printing apparatus is in a logout state in which no user is logged in, the controller is configured to cause the user interface, in the accumulation printing, to display selectable items for the print data, among the print data accumulated in the memory, to which the third user identification information and the authentication information are set.

3. The printing apparatus according to claim 1,
wherein, when the printing apparatus is not set to operate in the first authentication mode and the printing apparatus is in a logout state in which no user is logged in, the controller is configured to cause the user interface, in the accumulation printing, to display selectable items for any of the print data to which the first user identification information and the authentication information are set, the print data to which the second user identification information and the authentication information are set, and the third user identification information and the authentication information are set, among the print data accumulated in the memory.

4. The printing apparatus according to claim 1,
wherein the printing apparatus is configured to operate in a second authentication mode, the second authentication mode being a mode in which the printing apparatus is configured to receive a login operation through the user interface, and authenticate a user designated by the login operation as a logged-in user who has logged in to the printing apparatus by communicating with an authentication server through the network interface,
wherein, when the first authentication mode is set and the first user is the logged-in user, the controller is configured to cause the user interface, in the accumulation printing to,
  display selectable items regarding the print data to which first user identification information and the authentication information are set among the print data accumulated in the memory, the first user identification information being the user identification information indicating the first user; and
  not display selectable items regarding the print data to which the first user identification information is not set among the print data accumulated in the memory,
wherein the controller is further configured to:
  receive an operation to select print data to be subject to print from among the print data that corresponds to the selectable items displayed by the user interface;
  receive an operation to input the authentication information set to the print data as selected through the user interface; and
  print the print data as selected when the first user is allowed, based on the authentication information, to use a print function among functions provided to the printing apparatus,
wherein, when the second authentication mode is set, when authentication by the authentication server is successful and when the first user is the logged-in user, the controller is configured to cause the user interface, in the accumulation printing, to display selectable items for the print data, among the print data accumulated in the memory, to which the first user identification information and the authentication information are set,
wherein the controller causes the user interface not to display selectable items for the print data, among the print data accumulated in the memory, to which the second user identification information and the authentication information are set and the print data to which the third user identification information and the authentication information are set, and
wherein, when the controller is configured to receive an operation to select print data to be subject to print from among the print data that corresponds to the selectable items displayed by the user interface and receive an operation to input the authentication information set to the print data as selected through the user interface, the controller is configured to print the print data as selected.

5. The printing apparatus according to claim 4,
wherein, when the first authentication mode is set and the printing apparatus operates in a logout state in which no user is logged in, the controller is configured to cause the user interface, in the accumulation printing, to display, from among the print data accumulated in the memory, selectable items corresponding to the print data to which the first user identification information and the authentication information are set, the print data to which the second user identification information and the authentication information are set, and the print data to which the third user identification information and the authentication information are set, and
wherein, when the second authentication mode is set and the printing apparatus is in the logout state, the controller is configured to cause the user interface not to display selectable items corresponding to any of the print data to which the user identification information and the authentication information are set.

6. The printing apparatus according to claim 1,
wherein the printing apparatus is configured to be set to operate in a login user data list mode,
wherein, when the first authentication mode is set but the login user data list mode is not set, and when the first user is the logged-in user, the controller is configured to cause the user interface, in the accumulation printing, to:
  display selectable items for the print data, among the print data accumulated in the memory, to which first user identification information and the authentication information are set, the first user identification information being the user identification information indicating the first user; and
  not display selectable items regarding the print data, among the print data accumulated in the memory, to which the first user identification information is not set,
wherein, when the controller is configured to receive an operation to select print data to be subject to print from among the print data that corresponds to the selectable items displayed by the user interface and receive an operation to input the authentication information set to the print data as selected through the user interface, the controller is configured to print the print data as selected,
wherein, when the first authentication mode and the login user data list mode are set, and when the first user is the logged-in user, the controller is configured to cause the user interface, in the accumulation printing, to:
  display selectable items for the print data, among the print data accumulated in the memory, to which first user identification information is set, and the authentication information are set, the first user identification information being the user identification information indicating the first user; and
  not display selectable items for the print data, among the print data accumulated in the memory, to which either the second user identification information or the third user identification information is set, and
wherein, when the controller is configured to receive an operation to select print data to be subject to print from among the print data that corresponds to the selectable items displayed by the user interface and receive an operation to input the authentication information set to the print data as selected through the user interface, and when the first user is allowed to use a printing function, among functions provided to the printing apparatus, based on the authority information, the controller is configured to print the print data as selected.

7. The printing apparatus according to claim 6,
wherein, when the first authentication mode is set but the login user data list mode is not set, and when the printing apparatus is in a logout state that is a state when no user is logged in, the controller is configured to cause the user interface, in the accumulation printing, to display the selectable items for any of the print data, among the print data accumulated in the memory, to which the first user identification information and the authentication information are set, to which the second user identification information and the authentication information are set, and to which the third user identification information and the authentication information are set,
wherein, when the controller is configured to receive an operation to select print data to be subject to print from among the print data that corresponds to the selectable items displayed by the user interface and receive an operation to input the authentication information set to the print data as selected through the user interface, and when a user indicated by the user identification information set to the print data as selected is allowed to use a printing function, among functions provided to the printing apparatus, based on the authority information, the controller is configured to print the print data as selected,
wherein, when the first authentication mode and the login user data list mode are set, and when the printing apparatus is in the logout state, the controller is configured to cause the user interface, in the accumulation printing, to:
  not display selectable items regarding the print data, among the print data accumulated in the memory, to which either the first user identification information or the second user identification information is set, and
  display selectable items regarding the print data to which the third user identification information is set, and
wherein, when the controller is configured to receive an operation to select print data to be subject to print from among the print data that corresponds to the selectable items displayed by the user interface and receive an operation to input the authentication information set to the print data as selected through the user interface, and when a public user who is a logged-out user is allowed to use a printing function, among functions provided to the printing apparatus, based on the authority information, the controller is configured to print the print data as selected.

8. The printing apparatus according to claim 7,
wherein the printing apparatus is configured to be set to operate in a second authentication mode,
wherein the second authentication mode is a mode in which the printing apparatus is capable of receiving a login operation through the user interface, a user designated by the login operation in the second authentication mode being authenticated, by communicating with an authentication server through the network interface, as a logged-in user who logged in the printing apparatus,
wherein, when the second authentication mode is set and when the authentication by the authentication server is successful and the first user is authenticated as the logged-in user, the controller is configured to cause the user interface, in the accumulation printing, to:
  display selectable items for the print data, among the print data accumulated in the memory, to which the first user identification information is set; and
  not display selectable items for any of the print data, among the print data accumulated in the memory, to which the second user identification information or the third user identification information is set, and
wherein, when the second authentication mode is set and the printing apparatus is in a logout state in which no user is logged in, the controller is configured to:
  not perform the accumulation printing until the authentication by the authentication server succeeds; and
  not cause the user interface to display selectable items regarding any of the print data to which the first user identification information set, the print data to which the second user identification information set, and the print data to which the third user identification information is set.

9. A printing apparatus, comprising:
a print engine;
a network interface;
a memory;
a user interface; and
a controller,
wherein, when multiple pieces of print data are accumulated in the memory, the controller is configured to perform accumulation printing including:
  causing the user interface to display selectable items corresponding to the multiple pieces of print data accumulated in the memory;
  receiving, through the user interface, an operation to select print data to be printed from among the multiple pieces of print data for which corresponding selectable items are displayed through the user interface; and
  printing selected print data,
wherein, when multiple pieces of print data are accumulated in the memory, the controller is configured to perform accumulation printing including:
  causing the user interface to display selectable items corresponding to the multiple pieces of print data accumulated in the memory;
  receiving, through the user interface, an operation to select print data to be printed from among the multiple pieces of print data for which corresponding selectable items are displayed through the user interface; and
  printing selected print data,
wherein each piece of print data is based on a print job that is received through the network interface and set with user identification information indicating the user, the user identification information indicating:
  a user identified in the print job when the print data is based on the print job that identifies the user;
wherein the printing apparatus is configured to be set to operate in a first authentication mode,
wherein the first authentication mode is a mode in which the printing apparatus is capable of receiving a login operation through the user interface, and in which the printing apparatus determines a function to be allowed for a logged-in user based on authority information representing authority of the logged-in user which is stored in the memory in advance, the logged-in user being a user logged-in to the printing apparatus in the login operation to use from among functions, the functions equipped to the printing apparatus,
wherein the selectable items include selectable indications of print jobs,
wherein, when the first authentication mode is set and a first user, whose authority information is registered in the memory, is the logged-in user, the controller is configured to cause, in the accumulation printing, the user interface to:
  display selectable indications of print jobs for the print data, among the print data accumulated in the memory, to which first user identification information and authentication information are set, the first user identification information indicating the first user; and
  not display the selectable indications of print jobs for the print data, among the print data accumulated in the memory, to which the first user identification information is not set, and
wherein, when the printing apparatus is not set to be in the first authentication mode and the printing apparatus is in a logout state in which no user is logged in, the controller is configured to cause the user interface, in the accumulation printing, to display selectable indications of print jobs for any of the print data to which the first user identification information and the authentication information are set, the print data to which second user identification information and the authentication information are set, and third user identification information and the authentication information are set, among the print data accumulated in the memory, the second user identification information being user identification information indicating a second user whose authority information is registered in the memory and who is different from the first user, the third user identification information being user identification information indicating a third user whose authority information is not registered in the memory.

10. A printing apparatus, comprising:
a print engine;
a network interface;
a memory;
a user interface; and
a controller,
wherein, when multiple pieces of print data are accumulated in the memory, the controller is configured to perform accumulation printing including:
  causing the user interface to display selectable items corresponding to the multiple pieces of print data accumulated in the memory;
  receiving, through the user interface, an operation to select print data to be printed from among the multiple pieces of print data for which corresponding selectable items are displayed through the user interface; and
  printing selected print data,
wherein each piece of print data is based on a print job that is received through the network interface and set with user identification information indicating the user, the user identification information indicating:
  a user identified in the print job when the print data is based on the print job that identifies the user;
wherein the printing apparatus is configured to be set in either a first authentication mode or a second authentication mode,
wherein the first authentication mode is a mode in which the printing apparatus is capable of receiving a login operation through the user interface, and in which the printing apparatus determines a function to be allowed for a logged-in user based on authority information representing authority of the logged-in user which is stored in the memory in advance, the logged-in user being a user logged-in to the printing apparatus in the login operation to use from among functions, the functions equipped to the printing apparatus, and
wherein the second authentication mode is a mode in which the printing apparatus is configured to receive a login operation through the user interface, and authenticate a user designated by the login operation as a logged-in user who has logged in to the printing apparatus by communicating with an authentication server through the network interface,
wherein the selectable items include selectable indications of print jobs,
wherein, when the first authentication mode is set and a first user, whose authority information is registered in the memory, is the logged-in user, the controller is configured to cause, in the accumulation printing, the user interface to:
   display selectable indications of print jobs for the print data, among the print data accumulated in the memory, to which first user identification information and authentication information are set, the first user identification information indicating the first user; and
   not display the selectable indications of print jobs for the print data, among the print data accumulated in the memory, to which the first user identification information is not set,
wherein the controller is further configured to:
   receive an operation to select print data to be subject to print from among the print data that corresponds to the selectable indications of print jobs displayed by the user interface;
   receive an operation to input the authentication information set to the print data as selected through the user interface; and
   print the print data as selected when the first user is allowed, based on the authentication information, to use a print function among functions provided to the printing apparatus,
wherein, when the second authentication mode is set, authentication by the authentication server is successful and the first user is the logged-in user, the controller is configured to cause the user interface, in the accumulation printing, to:
   display selectable indications of print jobs for the print data, among the print data accumulated in the memory, to which the first user identification information and the authentication information are set; and
   not display the selectable indications of print jobs for the print data, among the print data accumulated in the memory, to which second user identification information and the authentication information are set and the print data to which third user identification information and the authentication information are set,
wherein, when the controller is configured to receive an operation to select print data to be subject to print from among the print data that corresponds to the selectable indications of print jobs displayed by the user interface and receive an operation to input the authentication information set to the print data as selected through the user interface, the controller is configured to print the print data as selected,
wherein the second user identification information is user identification information indicating a second user whose authority information is registered in the memory and who is different from the first user, and
wherein the third user identification information is user identification information indicating a third user whose authority information is not registered in the memory.

11. A printing apparatus, comprising:
a print engine;
a network interface;
a memory;
a user interface; and
a controller,
wherein, when multiple pieces of print data are accumulated in the memory, the controller is configured to perform accumulation printing including:
   causing the user interface to display selectable items corresponding to the multiple pieces of print data accumulated in the memory;
   receiving, through the user interface, an operation to select print data to be printed from among the multiple pieces of print data for which corresponding selectable items are displayed through the user interface; and
   printing selected print data,
wherein each piece of print data is based on a print job that is received through the network interface and set with user identification information indicating the user, the user identification information indicating:
   a user identified in the print job when the print data is based on the print job that identifies the user;
wherein the printing apparatus is configured to be set to either of a first authentication mode or a login user data list mode,
wherein the first authentication mode is a mode in which the printing apparatus is capable of receiving a login operation through the user interface, and in which the printing apparatus determines a function to be allowed for a logged-in user based on authority information representing authority of the logged-in user which is stored in the memory in advance, the logged-in user being a user logged-in to the printing apparatus in the login operation to use from among functions, the functions equipped to the printing apparatus,
wherein the selectable items include selectable indications of print jobs,
wherein, when the first authentication mode is set, the login user data list mode is not set, and a first user who is a user whose authority information is registered in the memory is the logged-in user, the controller is configured, in the accumulation printing, to cause the user interface to:
   display selectable indications of print jobs for the print data, among the print data accumulated in the memory, to which first user identification information and authentication information are set, the first user identification information being the user identification information indicating the first user; and
   not display the selectable indications of print jobs regarding the print data, among the print data accumulated in the memory, to which the first user identification information is not set,
wherein, when the controller is configured to receive an operation to select print data to be subject to print from among the print data that corresponds to the selectable indications of print jobs as displayed and receive an operation to input the authentication information set to the print data as selected through the user interface, the controller is configured to print the print data as selected,
wherein, when the first authentication mode and the login user data list mode are set, and the first user is the logged-in user, the controller is configured, in the accumulation printing, to cause the user interface to:
   display selectable indications of print jobs for the print data, among the print data accumulated in the memory, to which the first user identification information is set;
   not display selectable indications of print jobs for any of the print data, among the print data accumulated in the memory, to which either second user identification information or third user identification information is set, wherein, when the controller is configured to receive an operation to select print data to be subject to print from among the print data that corresponds to the selectable indications of print jobs as displayed through the user interface, and when the first user is allowed to use a print function, among the functions provided to the printing apparatus, based on the authority information, the controller is configured to print the print data as selected, wherein the second user identification information is user identification information indicating a second user whose authority information is registered in the memory and who is different from the first user, and wherein the third user identification information is user identification information indicating a third user whose authority information is not registered in the memory.

* * * * *